United States Patent [19]

Dwyer

[11] 4,419,534
[45] Dec. 6, 1983

[54] END CAP FOR COMMUNICATIONS CABLES

[75] Inventor: Liam D. Dwyer, Corinth, Miss.

[73] Assignee: American Sawmill Machinery Company, Corinth, Miss.

[21] Appl. No.: 445,662

[22] Filed: Nov. 30, 1982

[51] Int. Cl.³ .......................... H02G 1/08; H02G 15.23
[52] U.S. Cl. .................................... 174/10; 174/19; 174/79; 254/134.3 R; 403/275
[58] Field of Search .............. 174/10, 19, 74 R, 74 A, 174/79, 135; 254/134.3 R, 134.3 FT; 339/100, 276 D; 403/36, 275, 276, 277, 284, 285

[56] References Cited

U.S. PATENT DOCUMENTS 3,989,400 11/1976 Smith et al. ..................... 403/275
4,002,817 1/1977 DeGrado ............................ 174/10

Primary Examiner—Laramie E. Askin
Attorney, Agent, or Firm—Bacon & Thomas

[57] ABSTRACT

In an end cap for communications cables, and particularly one equipped with a pulling eye, an axial spigot provided with cable engaging enlargements is also formed so as to define longitudinally extending surface channels for the passage of gas, which channels are protected from entry of cable conductors either by being oriented at an angle to the lay of the conductors, or by the insertion of a small bore air carrying tube.

9 Claims, 6 Drawing Figures 4,419,534

END CAP FOR COMMUNICATIONS CABLES

FIELD OF THE INVENTION

This invention relates to an end cap for communications cables, and particularly an end cap incorporating a pulling eye such that the cable may be pulled into the location in which it is to be installed, for example through an underground cable conduit.

BACKGROUND OF THE INVENTION

When installing communications cables in underground conduits, it is common practice to supply gas at super-atmospheric pressure to the interior of the cable with a view to avoiding any danger of leakage of ground water into the cable interior through its sheath. Additionally, the maintenance of pressure within the sheath is an indication that the latter has not suffered damage during installation. Pressurization of cables during installation is presently accomplished by applying end caps to the ends of the cable to seal the latter, and applying gas under pressure through valves incorporated in the sealing caps. Where the cable is to be pulled into its final location, one of these end caps will be equipped with a pulling eye and designed to transmit tensile forces to the cable. In order to transmit such tensile forces to the cable, it is known to provide end caps in the form of a tubular sleeve which fits over an end of the cable, the sleeve being closed at one end by a closure having an external pulling eye and a spigot which extends axially of the sleeve. When the end cap is fitted, the spigot is driven into the end of the cable, and the sleeve is then circumferentially crimped so that the cable conductors are compressed against the spigot. The spigot is shaped with at least one enlargement intermediate its length so as to help retain the conductors and and distribute the tensile loadings between the spigot and sleeve.

A disadvantage of this arrangement (which may also be used as an end cap at the other end of the cable, in which case the pulling eye may be omitted) is that the crimping of the sleeve onto the cable end compresses the conductors together so firmly that the passage of pressurizing air from a valve in the end cap to the interior of the cable is restricted or prevented. One proposal for overcoming this problem is found in U.S. Pat. No. 3,989,400 issued Nov. 2, 1976 to Smith et al, in which the valve in the end cap is arranged so as to introduce air into an axial bore extending the length of the spigot. This solution is less than ideal. The longitudinal drilling of the spigot is an expensive operation, and the spigot must then either be attached to the end cap by a threaded or other mechanical connection, as shown, so as to achieve communication with the valve, or the necessary drilling must be carried out after the spigot has been welded to the end cap. These requirements add greatly to the cost of producing the device, whilst the longitudinal bore in the spigot inevitably reduces its strength. Furthermore, there is a danger that the downstream end of the bore may be obstructed by cable conductors, thus again restricting the rate at which air can be introduced into the cable.

Another prior art proposal is to be found in U.S. Pat. No. 4,002,817 issued Jan. 11, 1977 to DeGrado. In DeGrado, a small bore tube is provided coaxial with the sleeve for the injection of air, but this tube takes no part in the transfer of tensile forces between the pulling eye and the cable, its sole purpose being to act as a gas conduit.

SUMMARY OF THE INVENTION

The present invention seeks to provide a cable end cap and particularly an end cap provided with a pulling eye, having a central spigot which cooperates with the crimps in the sleeve to transmit tensile forces to the cable conductors, and which at the same time permits satisfactory pressurization of the cable interior.

According to the invention, an end cap for communication cables having multiple conductors comprises a cylindrical sleeve open at one end and disconnected to receive an end of the cable, the sleeve being circumferentially crimpable to constrict the cable and form a gas tight seal therewith, a closure at the other end of the sleeve, a spigot extending axially within the sleeve from the closure and provided with at least one portion intermediate its length which is of enlarged cross section relative to the axially adjacent portions, and means in the end closure for introducing pressurized gas into the sleeve, wherein at least one continuous passageway for gas, extending substantially the length of the spigot and protected from obstruction by conductors of the cable, is formed in at least one longitudinally extending channel defined in the surface of the spigot.

The channel or channels may be formed in the spigot in various ways, as described further below, and the passageways formed in the channels may be protected against the entry of cable conductors either by orienting the channels so that they lie at an angle to the lay of the cable conductors or by forming the passageway in a small bore tube laid in the channel.

Further features of the invention will become apparent from the following description of preferred embodiments with reference to the accompanying drawings.

BRIEF DESCRIPTION OF THE DRAWINGS

In the drawings:

FIG. 6 is a cross section taken along the line 6—6 in FIG. 2.

DESCRIPTION OF THE PREFERRED EMBODIMENTS

Figure 1:
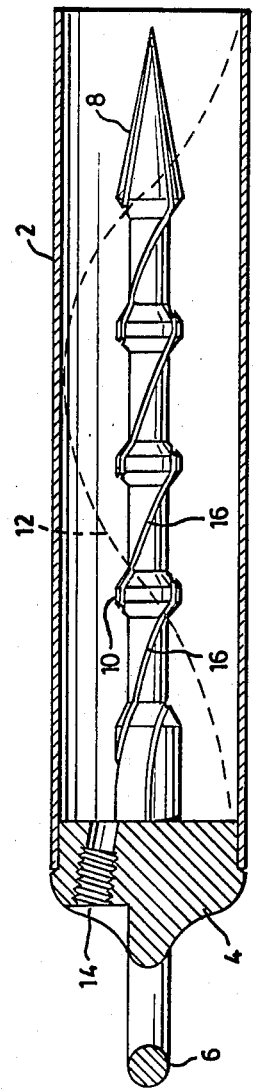
FIG. 1 is a longitudinal cross section through a cable end cap equipped with a pulling eye, illustrating a first embodiment of the invention.
Figure 2:
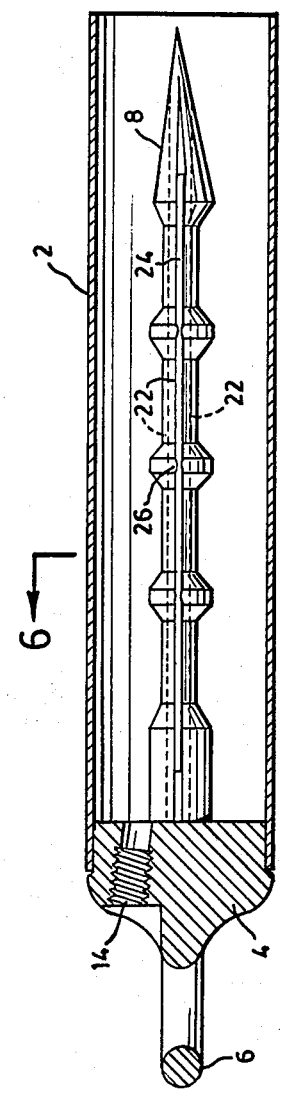
FIG. 2 is a longitudinal section through a similar end cap, illustrating a further embodiment of the invention.

Referring first to FIGS. 1 and 2, the end caps illustrated are largely of known construction, except as described below, being in most respects similar to the end caps with pulling eyes sold under the trade mark TEL-EYE by Tel-Eye Industries of Corinth, Miss. These consist of a cylindrical steel sleeve 2, which can be circumferentially crimped at axially spaced locations so as to grip a cable, the end of which is inserted in the sleeve, an end closure 4 welded to the sleeve and equipped with a pulling eye 6, and a forged axial spigot 8 having a pointed free end and alternating portions of greater and smaller diameter arranged down the remainder of its length. The spigot is welded to the closure 4. The crimps are axially positioned so as to occur between the enlarged diameter portions 10 of the spigot so that the sleeve and spigot cooperate in firmly gripping the conductors of the cable (only one exemplary conductor 12 of the cable is shown by a broken line 12). The closure 4 is provided with a bore 14 containing an air valve through which air may be admitted to the interior of the sleeve.

Figure 4:
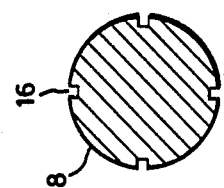
FIGS. 3 to 6 are cross sections through spigots used in end caps, illustrating cross sections utilized in various different embodiments of the invention.
Figure 3:
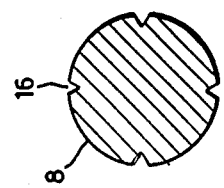
Figure 5:
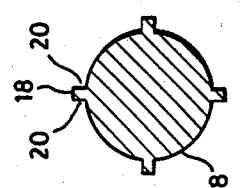

In order that air introduced through the valve 14 may readily reach the interior of that part of the cable beyond the end cap, even after the sleeve 2 has been crimped onto the cable end, the spigot is modified by the provision of at least one and preferably several spiral grooves 16. The direction of the spiral of the grooves 16 is opposite to that of the spiral lay of the cable conductors 12, so that the latter cannot drop into and obstruct the grooves 16. The grooves themselves may have various configurations, for example V-shaped as shown in FIG. 3 or rectangular as shown in FIG. 4. In another variant, the grooves are replaced by beads 18 as shown in FIG. 5, the beads 18 supporting the conductors clear of the spigot immediately adjacent the beads so as to form channels 20 to either side of the beads. In each case, the configuration of the grooves or beads is such as to provide longitudinally extending channels defined at the surface of the spigot and providing a continuous passageway for gas extending from adjacent the root of the spigot to adjacent its tip. Because the channels are open towards the exterior, of considerable length, and will be bridged by a number of the conductors of the cable, uninterrupted passage of air from the valve in the closure 4 to the cable beyond the cap is assured.

Figure 6:
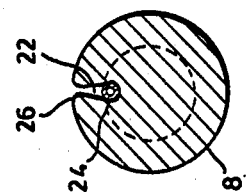

The grooves or ribs may be forged into the spigots during their manufacture, and can readily be configured so as not to reduce the strength of the latter. Moreover, the spigot so formed can be welded to the closure 4 in the usual manner.

Where the angle of lay of the cable conductors is sufficient, it is possible for the grooves or beads to extend straight down the length of the spigot as shown in FIG. 2, which again simplifies construction of the spigot. Even when the angle of lay of the cable is not sufficient, it is possible to use a straight channel, by cutting a longitudinal slot 22 (see also FIG. 6) and inserting a length of small diameter tubing 24 at the bottom of the slot. The tube may be retained in place by peening over the edges of the slot at the enlarged diameter portions of the spigot as shown at 26. Preferably the tube terminates short of the end of the ends of the channel (see FIG. 2) so as to avoid unduly reducing the dimensions of the entrance and exit catchments of the tube. Rather than requiring a modified forging, this embodiment of the invention can be implemented merely by cutting a longitudinal slot in an existing design of spigot so as to receive the tube 24. Although there will be some slight reduction in the strength of the spigot, this will not be serious, and the slot may be readily formed in the spigot prior to its welding to the closure 4.

I claim:

1. An end cap for communication cables having multiple conductors comprising a cylindrical sleeve open at one end and dimensioned to receive an end of the cable, the sleeve being circumferentially crimpable to constrict the cable and form a gas tight seal therewith, a closure at the other end of the sleeve, a spigot extending axially within the sleeve from the closure and provided with at least one portion intermediate its length which is of enlarged cross section relative to the axially adjacent portions, and means in the end closure for introducing pressurized gas into the sleeve, wherein at least one continuous passageway for gas, extending substantially the length of the spigot and protected from obstruction by conductors of the cable, is formed in at least one longitudinally extending channel defined in the surface of the spigot.

2. An end cap according to claim 1, wherein the closure is provided externally with a pulling eye.

3. An end cap according to claim 1, wherein each passageway is protected from conductor entry by configuring the channel so that it will extend at an angle to the lay of the cable conductors.

4. An end cap according to claim 3, for use with cables whose conductors have a spiral lay, wherein each channel is protected from conductor entry by extending parallel to the longitudinal axis of the spigot.

5. An end cap according to claim 3, for use with cables having a spiral lay, wherein each channel forms a spiral along the longitudinal axis of the spigot opposite to that of the lay of the cable with which it is to be used.

6. An end cap according to claim 3, wherein each channel is defined adjacent a longitudinally extending projection or bead formed on the spigot.

7. An end cap according to claim 1, wherein the at least one passageway is formed by an open ended tube secured within the channel.

8. An end cap according to claim 7, wherein the channel is a longitudinal slot cut in the spigot, and the tube is held in the slot by deformation of the edges of the slot.

9. An end cap according to claim 7, wherein the ends of the tube are wholly within the slot.

* * * * *

UNITED STATES PATENT AND TRADEMARK OFFICE
CERTIFICATE OF CORRECTION

PATENT NO.   :   4,419,534
DATED        :   December 6, 1983
INVENTOR(S)  :   Liam D. DWYER It is certified that error appears in the above-identified patent and that said Letters Patent is hereby corrected as shown below:

Column 2, line 13, "disconnected" should read -- dimensioned --

Signed and Sealed this

First Day of May 1984

[SEAL]

Attest:

GERALD J. MOSSINGHOFF

Attesting Officer

Commissioner of Patents and Trademarks